United States Patent
Laurie et al.

(10) Patent No.: US 12,529,134 B1
(45) Date of Patent: Jan. 20, 2026

(54) METHODS OF MAKING SILVER/SILVER CHLORIDE ELECTRODES BY VAPOR DEPOSITION TECHNIQUES

(71) Applicant: Rhythmlink International, LLC, Columbia, SC (US)

(72) Inventors: Samuel William Laurie, Columbia, SC (US); Brian Petree, West Columbia, SC (US)

(73) Assignee: Rhythmlink International, LLC, Columbia, SC (US)

( * ) Notice: Subject to any disclaimer, the term of this patent is extended or adjusted under 35 U.S.C. 154(b) by 0 days.

(21) Appl. No.: 18/404,316

(22) Filed: Jan. 4, 2024

Related U.S. Application Data (60) Provisional application No. 63/478,442, filed on Jan. 4, 2023.

(51) Int. Cl.
| | |
|---|---|
| *C23C 14/58* | (2006.01) |
| *A61B 5/265* | (2021.01) |
| *C23C 14/02* | (2006.01) |
| *C23C 14/20* | (2006.01) |
| *C23C 14/34* | (2006.01) |

(52) U.S. Cl.
CPC ........ *C23C 14/5846* (2013.01); *C23C 14/021* (2013.01); *C23C 14/028* (2013.01); *C23C 14/205* (2013.01); *C23C 14/34* (2013.01); *A61B 5/265* (2021.01); *A61B 2562/125* (2013.01)

(58) Field of Classification Search
CPC . C23C 14/5846; C23C 14/021; C23C 14/028; C23C 14/205; C23C 14/34; A61B 5/265; A61B 2562/125
See application file for complete search history.

(56) References Cited

U.S. PATENT DOCUMENTS

| | | | |
|---|---|---|---|
| 6,032,064 A | 2/2000 | Devlin et al. | |
| 6,434,410 B1 | 8/2002 | Cordero et al. | |
| 6,505,069 B2 | 1/2003 | Scott et al. | |
| 6,609,018 B2 | 8/2003 | Cory et al. | |
| (Continued) | | | |

FOREIGN PATENT DOCUMENTS

| | | | | |
|---|---|---|---|---|
| CN | 2354141 Y | * 12/1999 | | |
| CN | 113647952 A | * 11/2021 | ............. | A61B 5/265 |
| (Continued) | | | | |

OTHER PUBLICATIONS

KR20130126158A Translation (Year: 2013).*

(Continued)

*Primary Examiner* — Patrick S Ott (74) *Attorney, Agent, or Firm* — Bryan L. Baysinger; Nicholas P. Stadnyk; Maynard Nexsen PC (57) ABSTRACT

A method for forming an Ag/AgCl coated electrode includes providing a polymeric electrode substrate made of Acrylonitrile Butadiene Styrene (ABS). A layer of silver (Ag) is deposited on the polymeric electrode substrate using physical vapor deposition (PVD) to form an Ag coated electrode. The layer of Ag is deposited to a first thickness by sputtering an Ag target onto the polymeric electrode substrate. The Ag coated electrode is then converted to a layer of silver/silver chloride (Ag/AgCl) by dipping it into a conversion solution. The resulting Ag/AgCl coated surface electrode provides improved performance and stability for various applications.

19 Claims, 4 Drawing Sheets

(56) References Cited

U.S. PATENT DOCUMENTS

| | | |
|---|---|---|
| 6,654,626 B2 | 11/2003 | Devlin et al. |
| 6,708,051 B1 | 3/2004 | Durousseau |
| 6,731,965 B2 | 5/2004 | Menon et al. |
| 6,731,987 B1 | 5/2004 | McAdams et al. |
| 6,847,836 B1 | 1/2005 | Sujdak |
| 7,006,929 B2 | 2/2006 | Oka et al. |
| 7,179,849 B2 | 2/2007 | Terry |
| 7,610,085 B2 | 10/2009 | Allgeyer |
| 7,643,861 B2 | 1/2010 | Ives et al. |
| 7,912,526 B2 | 3/2011 | Finneran et al. |
| 8,647,278 B2 | 2/2014 | Ji et al. |
| 8,862,222 B2 | 10/2014 | Savard et al. |
| 9,006,014 B2 * | 4/2015 | Mujeeb-U-Rahman ............... H01L 21/28556 438/668 |
| 9,035,017 B2 | 5/2015 | Berrang |
| 9,320,885 B2 | 4/2016 | Vasapollo |
| 9,833,160 B2 | 12/2017 | Burnham et al. |
| 9,913,973 B2 | 3/2018 | Yanaki |
| 9,980,659 B2 | 5/2018 | Sadeghian-Motahar et al. |
| 10,323,157 B2 | 6/2019 | Hagar et al. |
| 10,327,701 B2 | 6/2019 | Bonmassar et al. |
| 11,026,615 B2 | 6/2021 | Lee et al. |
| 11,199,519 B2 | 12/2021 | Futashima |
| 11,304,640 B2 | 4/2022 | Derry |
| 11,490,846 B2 | 11/2022 | Shinohara et al. |
| 11,512,384 B2 | 11/2022 | Vaddiraju et al. |
| 11,540,730 B2 | 1/2023 | Zhang et al. |
| 11,559,234 B2 | 1/2023 | Sayani et al. |
| 11,590,348 B2 | 2/2023 | Moaddeb et al. |
| 11,749,426 B2 | 9/2023 | Futashima et al. |
| 2003/0045787 A1 | 3/2003 | Schulze et al. |
| 2005/0261565 A1 | 11/2005 | Lane et al. |
| 2006/0004273 A1 | 1/2006 | Lobodzinski |
| 2006/0276702 A1 | 12/2006 | McGinnis |
| 2009/0048526 A1 | 2/2009 | Aarts et al. |
| 2010/0001814 A1 * | 1/2010 | Lobl ........ H03H 3/02 204/192.15 |
| 2010/0331659 A1 | 12/2010 | Sheraton, Sr. et al. |
| 2011/0015536 A1 | 1/2011 | Milgramm et al. |
| 2012/0035878 A1 * | 2/2012 | Phatak ............ G05B 19/41865 702/123 |
| 2013/0161182 A1 * | 6/2013 | Nagamine ............ C23C 14/505 204/192.1 |
| 2015/0141791 A1 | 5/2015 | O'Neill et al. |
| 2015/0374255 A1 | 12/2015 | Vasapollo |
| 2016/0066812 A1 * | 3/2016 | Cheng ................. A61B 5/0533 600/390 |
| 2018/0321174 A1 * | 11/2018 | Zhang ................. G01N 27/302 |
| 2019/0022371 A1 | 1/2019 | Chang et al. |
| 2019/0071765 A1 * | 3/2019 | Mak ................. C23C 14/0682 |
| 2019/0284683 A1 * | 9/2019 | Ouyang ............ H01L 21/68771 |
| 2020/0008717 A1 * | 1/2020 | Guy ..................... A61B 5/1477 |
| 2020/0146631 A1 | 5/2020 | Kim |
| 2020/0155002 A1 | 5/2020 | Nandi et al. |
| 2020/0159324 A1 * | 5/2020 | Keller ..................... G06F 3/015 |
| 2020/0289015 A1 | 9/2020 | Bowers |
| 2021/0121113 A1 | 4/2021 | Katsuhara et al. |
| 2021/0307665 A1 | 10/2021 | Hatakeyama et al. |
| 2021/0330232 A1 | 10/2021 | Oziat et al. |
| 2022/0133201 A1 | 5/2022 | Hatakeyama et al. |
| 2022/0220313 A1 | 7/2022 | Ikeda et al. |
| 2022/0346689 A1 * | 11/2022 | Yoshino ................... A61N 1/04 |
| 2022/0361760 A1 | 11/2022 | Bhagat et al. |
| 2023/0018091 A1 | 1/2023 | Joshi et al. |
| 2023/0111302 A1 | 4/2023 | Vlasov et al. |
| 2023/0116523 A1 | 4/2023 | Floyd et al. |
| 2023/0144282 A1 | 5/2023 | Fabregat Sanjuan et al. |

FOREIGN PATENT DOCUMENTS

| | | | |
|---|---|---|---|
| EP | 1330642 B1 | | 11/2007 |
| EP | 2229962 A1 | | 9/2010 |
| EP | 1412020 B1 | | 7/2011 |
| EP | 1558922 B1 | | 2/2013 |
| EP | 3511706 B1 | | 12/2021 |
| EP | 4140512 A1 | | 3/2023 |
| EP | 3809956 B1 | | 4/2023 |
| EP | 3871595 B1 | | 9/2023 |
| JP | 2004166934 A | | 11/2002 |
| JP | 2020080923 A | * | 6/2020 |
| JP | 6727399 B2 | | 7/2020 |
| JP | 7119252 B1 | | 8/2022 |
| KR | 20130126158 A | * | 11/2013 |
| WO | 2022183061 A2 | | 9/2022 |
| WO | 2022257514 A1 | | 12/2022 |
| WO | 2023099962 A1 | | 6/2023 |

OTHER PUBLICATIONS

JP-2020080923-A Translation (Year: 2020).*
CN-2354141-Y Translation (Year: 1999).*
CN-113647952-A Translation (Year: 2021).*

* cited by examiner

METHODS OF MAKING SILVER/SILVER CHLORIDE ELECTRODES BY VAPOR DEPOSITION TECHNIQUES

CROSS-REFERENCE TO RELATED APPLICATIONS

This application claims priority pursuant to 35 U.S.C. § 119 (e) to U.S. Provisional Patent Application Ser. No. 63/478,442, filed on Jan. 4, 2023, which is hereby incorporated by reference in its entirety.

FIELD

The present technology generally relates to manufacturing methods and production processes of electrodes, more particularly to systems and methods relating to techniques of thin-film physical vapor deposition (PVD) to impart beneficial qualities to electrodes.

BACKGROUND

Neuromonitoring electrodes offer the ability to acquire signals to monitor the electrical activity of the brain. For example, an electroencephalograph (EEG) may be attached to a patient, and is capable of acquiring or delivering electrical signals. An electrode is typically one part of a neuromonitoring system, which may further include a cable a connector which may be attached to diagnostic equipment such as a computer, as well as other peripherals. The electrode itself it typically comprised of a conductive material (e.g. metals, graphite/carbon, doped polymers), shows good corrosion resistance, and may be designed with a particular hardness, form, and size to accommodate an application.

Physical vapor deposition, sometimes called physical vapor transport, describes a variety of vacuum deposition methods which can be used to produce thin films and coatings on substrates, including metals, ceramics, glass, and polymers. PVD is characterized by a process in which the material transitions from a condensed phase to a vapor phase and then back to a thin film condensed phase. There are several types of PVD techniques, including sputtering, evaporation, and ion plating. In sputtering, a material is vaporized by bombarding it with ions, which knock atoms off the surface and create a vapor. In evaporation, a material is vaporized by heating it until it reaches its boiling point and forms a vapor. In ion plating, a material is vaporized using a beam of ions, which is directed at the substrate and causes the material to be deposited onto the surface.

Electrodes for use in neuromonitoring may comprise a substrate plated in Silver/Silver Chloride. Electroless plating methods are the most common process for depositing a thin layer of Silver/Silver Chloride onto the surface of a substrate to form an electrode. By their nature these methods produce large amounts of hazardous chemical waste and are dangerous to operate. Due to this, various countries' environmental safety programs are developing restrictions for this method of manufacturing. One such example would be the People's Republic of China, who are in the process of moving operations that utilize electroplating and electroless plating methods into specific manufacturing zones away from the general population.

Thus, there is a long sought need to make silver/silver chloride electrodes in which the environmental harms are reduced, waste is minimized, and overall manufacturing costs are lower. The disclosure herein provides embodiments in systems and methods that provide for technological advances in the manufacture of electrodes.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter At a high level, embodiments of the technology described herein are directed towards methods of producing and/or otherwise forming silver/silver chloride (Ag/AgCl) coated surface electrodes. In some embodiments, an electrode substrate can be provided and coated with a thin silver (Ag) layer (thin metallic film coating) to form a Ag coated electrode. In some instances, electrode substrate can be coated by a PVD process. In some further embodiments, the Ag coated electrode can be subjected to a conversion process to convert the Ag layer to a Ag/AgCl layer to form an Ag/AgCl coated surface electrode. In some aspects the conversion process can be carried out in a batch fashion using a dipping process or alternatively in a continuous fashion using a spraying process.

According to some embodiments, a method of forming an Ag/AgCl coated surface electrode comprises providing a polymeric electrode substrate, where the polymeric electrode substrate comprises, in some instances, Acrylonitrile Butadiene Styrene (ABS). The method further comprises depositing a layer of silver (Ag) on the polymeric electrode substrate by physical vapor deposition (PVD) to form an Ag coated electrode, wherein the layer of Ag is deposited to a first thickness, and wherein the depositing comprises sputtering an Ag target onto the polymeric electrode substrate. Subsequently, the method further comprises converting the layer of Ag to a layer of silver/silver chloride (Ag/AgCl) to form a Ag/AgCl coated surface electrode, wherein the converting comprises dipping the Ag coated electrode into a conversion solution.

According to some other embodiments a method of forming an Ag/AgCl coated surface electrode comprises injection molding a glass-filled ABS electrode substrate, and subsequently depositing a Ag layer onto or over the ABS electrode substrate by PVD to a determined thickness thereby forming a Ag coated electrode. Subsequently, the method comprises forming the Ag/AgCl coated surface electrode by converting the Ag layer into a Ag/AgCl layer by dipping or spraying the Ag coated electrode with a conversion solution, for example a conversion solution comprising a salt or chloride.

Additional objects, advantages, and novel features of the technology will be set forth in part in the description that follows, and in part will become apparent to those skilled in the art upon examination of the following, or can be learned by practice of the invention.

BRIEF DESCRIPTION OF THE DRAWINGS

Aspects of the present disclosure can be better understood with reference to the following drawings to illustrate various principles of the disclosure.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps disclosed herein unless and except when the order of individual steps is explicitly described.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Accordingly, embodiments described herein can be understood more readily by reference to the following detailed description, examples, and figures. Elements, apparatus, and methods described herein, however, are not limited to the specific embodiments presented in the detailed description, examples, and figures. It should be recognized that the exemplary embodiments herein are merely illustrative of the principles of the invention. Numerous modifications and adaptations will be readily apparent to those of skill in the art without departing from the scope of the technology.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Figure 1:
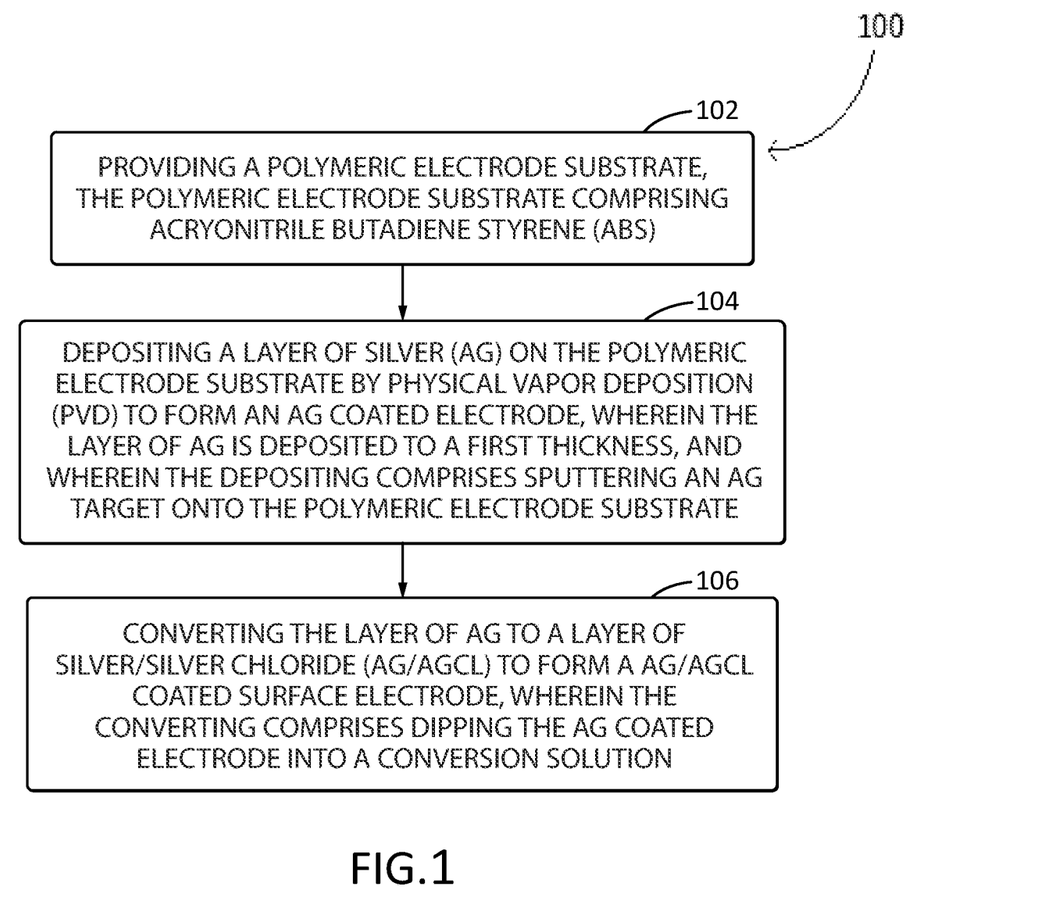
FIG. 1 shows an example flow diagram of a method of forming an Ag/AgCl electrode, according to some aspects of the technology described herein.

Referring now to the figures, FIG. 1 depicts an example flow diagram of a method of forming an Ag/AgCl electrode 100, according to the technology described herein. At step 102 a polymeric electrode substrate is provided, which can be formed from Acrylonitrile Butadiene Styrene (ABS). In some aspects the ABS electrode substrate is glass-filled and can in some instances be injection molded. At step 104, a layer of silver (Ag) is deposited onto or over the ABS electrode substrate by physical vapor deposition (PVD) to form a Ag coated electrode. In step 104, the layer of silver is deposited to at least a first thickness wherein the depositing comprises at least sputtering a Ag target material onto or over the ABS electrode substrate. At step 106, the layer of Ag of the Ag coated substrate is converted to a layer of silver/silver chloride (Ag/AgCl) to form a Ag/AgCl coated surface electrode, and in some aspects the converting comprises dipping and/or spraying the Ag coated electrode into or with a conversion solution.

Figure 2:
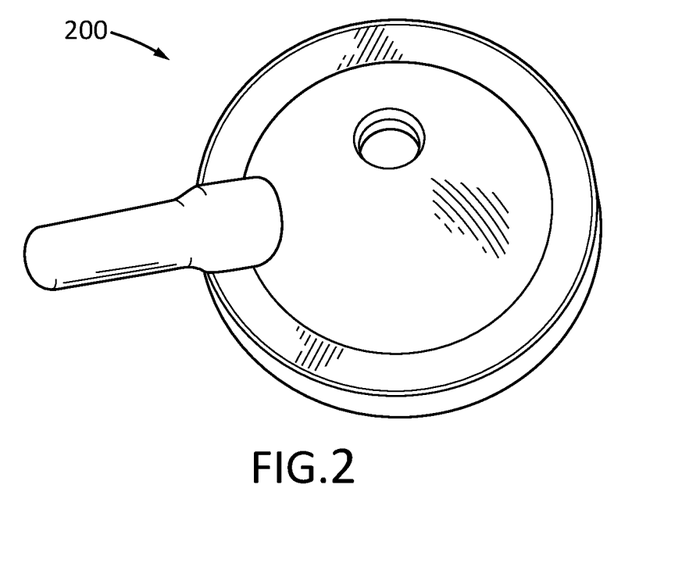
FIG. 2 shows an example electrode substrate, in accordance with some aspects of the technology described herein.
Figure 3:
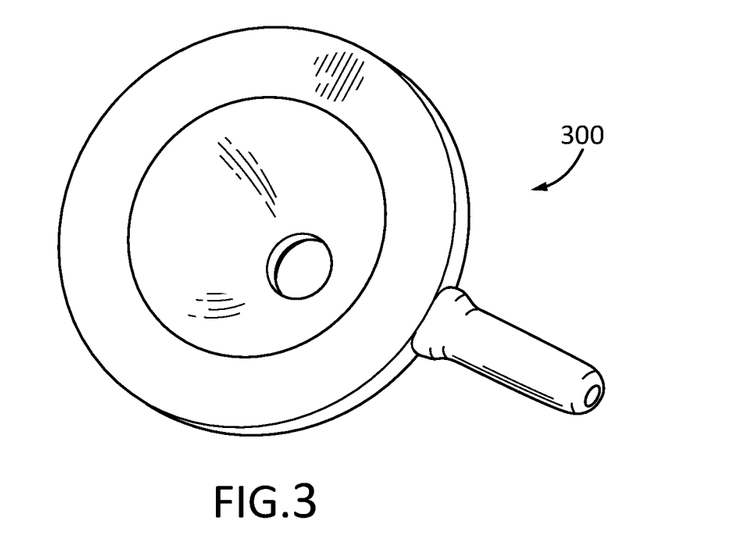
FIG. 3 shows an example of a sputter coated silver (Ag) layer electrode substrate, in accordance with some aspects of the technology described herein.
Figure 4:
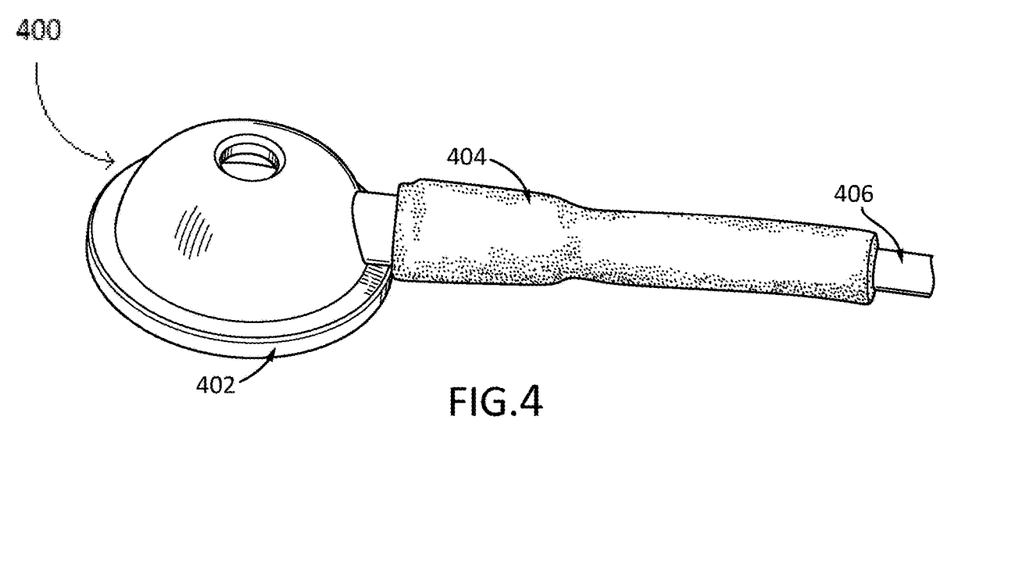
FIG. 4 shows an example of an assembled electrode post physical vapor deposition (PVD) process, in accordance with some aspects of the technology described herein.

Briefly referring to FIGS. 2 and 3, FIG. 2 shows an example polymeric electrode substrate 200 which has been formed by injection molding. FIG. 3 shows an example of a sputter coated silver (Ag) layer electrode substrate 300, in accordance with some aspects of the technology described herein, for instance an Ag coated electrode formed by a method described herein, for instance prior to a conversion process FIG. 4 shows an example of an assembled electrode in accordance with some aspects of the technology described herein. Electrode 400 is an assembled electrode post physical vapor deposition (PVD) process and conversion process, and incorporates a formed electrode with a Ag/AgCl coated surface electrode 402 which can be connected to (i.e. in electrical communication or physically attached) to a wire or lead 406, which can additionally incorporate an insulating sheath 404.

Figure 5:
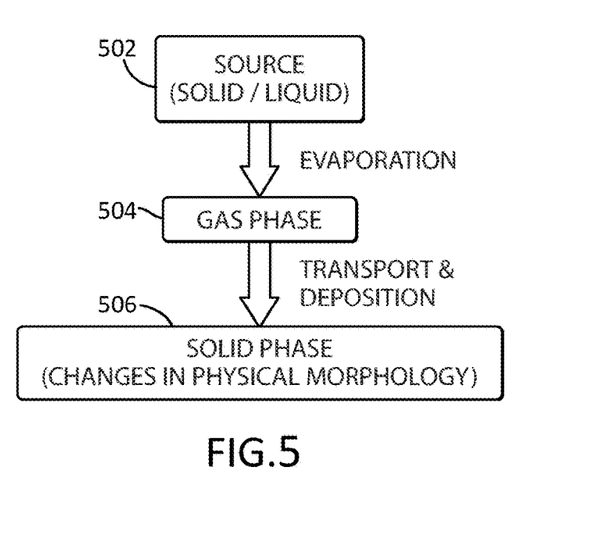
FIG. 5 is a flow diagram of an example PVD process, in accordance with some aspects of the technology described herein.

FIG. 5 generally depicts a flow diagram of an example PVD process with respect to the state changes that occur during deposition, in accordance with some aspects of the technology described herein. In some aspects, a source or target material 502 is applied with energy, e.g. heated to high vapor pressure by electrical resistance or by discharge by surrounding magnet bombardment in a vacuum to enable a gas phase 504 or vapor phase 504 which can be transported through a vacuum chamber and can condense or be deposited onto a substrate 506.

Figure 6:
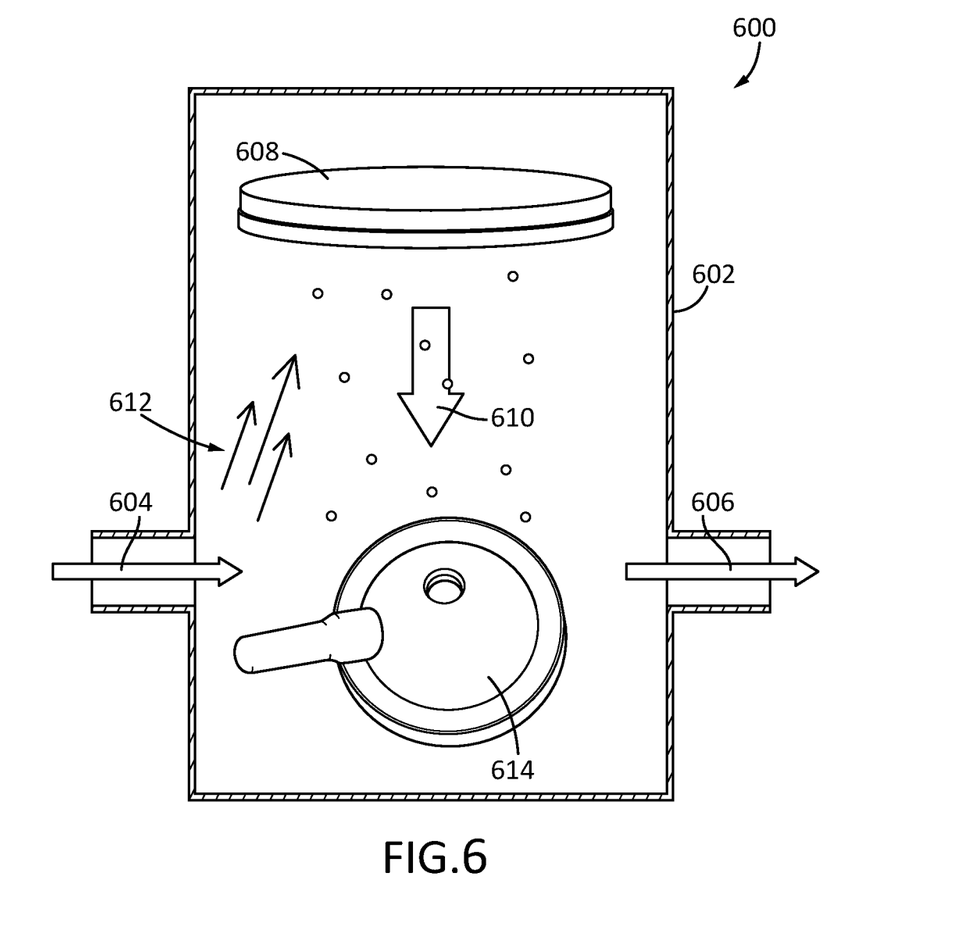
FIG. 6 is an illustration of an example PVD process applied to a substrate, in accordance with some aspects of the technology described herein.

FIG. 6 shows another illustration of an example PVD process 600 applied to a substrate 614, in accordance with some aspects of the technology described herein. Sputtering gas 604/606 can enter a vacuum chamber 602 and magnetic and/or electric field energy 612 can be directed at a target material 608, for example Ag, which is bombarded and can sputter material away as vapor or atomic material 610 that can be deposited onto substrate 614.

Described further herein are methods of making or producing Ag/AgCl coated surface electrodes. According to some embodiments, a method of forming an Ag/AgCl coated surface electrode comprises providing a polymeric electrode substrate, where the polymeric electrode substrate comprises, in some instances, Acrylonitrile Butadiene Styrene (ABS). In some instances, the ABS electrode substrate comprises a glass-filled or supported ABS substrate which can be injection molded. In one example, the electrode substrate is a 20% glass-filled ABS substrate. The method further comprises depositing a layer of silver (Ag) on the polymeric electrode substrate by physical vapor deposition (PVD) to form an Ag coated electrode, wherein the layer of Ag is deposited to a first thickness, and wherein the depositing comprises sputtering an Ag target onto the polymeric electrode substrate. In some example embodiments the first thickness can be from about 0.5 µm to about 1.5 µm. In some aspects the first thickness is achieved through a sputtering duration or time, for example up to about 300 seconds of sputtering, or up to about 500 seconds of sputtering. In some instances, the sputtering time can be adjusted based on a determined deposition rate. Additionally, in some embodiments, the PVD process can further include one or more sub-steps comprising roughing the surface of the ABS electrode substrate, generating a high vacuum environment, and etching the surface of the ABS electrode substrate. In some embodiments, PVD is carried out in the presence of a heat sink which can be enabled to remove heat from the surface of the electrode substrate being coated.

In some embodiments, subsequently the method further comprises converting the layer of Ag to a layer of silver/silver chloride (Ag/AgCl) to form a Ag/AgCl coated surface electrode (i.e. a conversion process), wherein the converting comprises dipping or spraying the Ag coated electrode into or with a conversion solution. In some embodiments, the conversion solution is a chloride or salt solution, for example the conversion solution can comprise hydrochloric acid (HCL), sodium chloride (NaCl), and/or sodium selenite ($Na_2SeO_3$). In some embodiments, the conversion solution comprises ferric chloride ($FeCl_3$). In some aspects, the conversion solution can be heated to a temperature not inconsistent with the technical objectives of the present invention, for example from about 40° C. to about 50° C. In some aspects, the dipping or spraying can be carried out for a time period not inconsistent with the technical objectives of the present invention, for example for about 30 to 60 seconds.

According to some other further aspects the converting comprises a rinsing step or cycle which can in some instances be followed by a stabilizing step. In some embodiments, a stabilizing step or cycle comprises placing or spraying the formed Ag/AgCl coated surface electrode in or with a stabilizing solution. In some aspects, the stabilizing solution can comprise one or more of water, NaCl, and glycerin. The stabilizing solution can be applied to the formed Ag/AgCl coated surface electrode for a time period not inconsistent with the technical objectives of the present invention, for example for up to or about 24 hours. According to some other further aspects, subsequent to the stabilizing step or cycle, the formed Ag/AgCl coated surface electrode can be subjected to a drying step or cycle. In some aspects, the drying step or cycle can be subjecting the Ag/AgCl coated surface electrode to heat for a period of time. Any heat and/or time combination not inconsistent with the technical objectives of the present invention can be used, for example from about 40° C. to about 60° C. for up to about 15 minutes, or up to about 20 minutes.

As will be appreciated, in one aspect, replacing electroless plating, also known as chemical plating or autocatalytic plating, as a process of manufacturing Silver/Silver Chloride electrodes with a process utilizing physical vapor deposition techniques would greatly reduce the hazardous waste output as well as increase operator safety. Physical vapor deposition allows the targets of the deposited material to be used at a near 100% capacity, namely due to the reusability of material in the chamber. A target used in physical vapor deposition is a mass of the chosen element or material to be vaporized and adhered to the surface of a substrate during the process. Due to the nature of the target vaporization, it is impossible to use 100% of a single target, but target manufacturers will accept the used targets of for example 40% of the original mass, and provide a new target at a 40% reduced price, then recycle the used target into more new targets. Target material left over in the chamber, that did not otherwise adhere to the surface of the substrate, can be collected using various methods from within the chamber to be reused in future targets. These two features of physical vapor deposition techniques are the cause for its near 100% use capacity. Physical vapor deposition also does not produce the harmful environmental waste that the electroless plating process otherwise would.

Electroless plating is a process used to deposit a layer of metal onto a substrate without the use of electricity. It is a chemical process that uses a reducing agent to reduce metal ions in a solution to a metallic state, resulting in the formation of a thin layer of metal on the surface of the substrate. In the electroless plating process, the substrate is first cleaned and prepared by removing any contaminants or oxide layers that may be present. It is then immersed in a bath containing a solution of metal ions and a reducing agent. As the substrate is immersed, the reducing agent reacts with the metal ions, reducing them to a metallic state and causing them to deposit onto the surface of the substrate.

Electroless plating is a useful process for applying a uniform layer of metal onto a substrate, particularly when the substrate has complex shapes or irregular surfaces that would be difficult to coat using other methods. It is also useful for depositing metals onto non-conductive materials, such as plastics, which cannot be electroplated. Electroless plating is used in a variety of applications, including the production of electronic components, automotive parts, and decorative items.

In manufacturing electrodes, the electroless plating process uses chromium trioxide or hexavalent chromium, in addition to concentrated acids such as sulfuric acid, both of which are regulated and require manufacturers to acquire extensive permitting in some countries as well as implement many safety controls and a hazardous waste disposal plan. An option of using physical vapor deposition as an alternative will allow manufacturers to lessen their environmental impact, improve the safety of their employees, and reduce costs around the regulation of the previously mentioned materials. Therefore, physical vapor deposition provides a competitive alternative to the electroless plating process.

In manufacturing electrodes to be used for neurological monitoring, a thin, silver layer can be formed on a substrate, the substrate usually of a polymeric material such as a polymer or copolymer, or for example Acrylonitrile Butadiene Styrene (ABS), and is then introduced to a solution containing sodium chloride, allowing the chloride ions to interact with the Silver (Ag) on the surface to form a layer of Silver Chloride (AgCl). This AgCl layer is essential for biomonitoring applications due to two main reasons: (1) low half-cell potential and conversion of ion current to electron current; (2) The low half-cell potential ensures low DC offset while the chloride ions interact with common gels to ensure efficient conversion of signals able to be transmitted through conductive lead wires.

In some instances, by utilizing PVD in the making or manufacture of an Ag/AgCl electrode the deficiencies and issues associated with electroless plating are overcome. In one embodiment of the present technology, making a Ag/AgCl electrode includes forming a thin layer of silver (i.e. a silver film layer) on an electrode substrate through physical vapor deposition, removing the electrode from the PVD equipment, introducing the silver (Ag) coated electrode to a salt solution, e.g. a chloride solution, to form the Ag/AgCl electrode, removing the electrode from the chloride solution and subsequently introducing the Ag/AgCl electrode to a stabilizing solution. In another embodiment, making a Ag/AgCl electrode includes subjecting the electrode to a continuous process comprising multiple stages. In sime instances, an electrode substrate can be introduced to a PVD sputtering stage to form the thin layer of silver (Ag), to form an Ag coated electrode, and then the Ag coated electrode can be transferred to a liquid spray stage to form the thin Ag/AgCl layer, e.g. by converting at least some of the Ag layer via a sprayed salt (e.g. chloride) solution. The electrode can then be deposited into a stabilization bath. As will be appreciated, in this instance, a more automatic process is provided and may even include molding (i.e. injection molding) of polymeric electrode substrates prior to coating.

Accordingly, in some embodiments of the present technology, processes and/or methods are provided for making, creating, or otherwise manufacturing silver/silver chloride (Ag/AgCl) electrodes or Ag/AgCl coated surface electrodes are provided. In some aspects, methods of making Ag/AgCl coated surface electrodes comprise physical vapor deposition (PVD) techniques. In some further aspects, methods of making Ag/AgCl coated surface electrodes comprise coated surface conversion techniques. According to some aspects, PVD, or thin-film coating, can be utilized to coat a molded part by a process in which a solid material is vaporized in a vacuum and deposited onto or over the surface of the molded part. As will be appreciated, coating in this way is not done simply in a layering fashion, but instead deposited atom by atom to form a thin bonded metal surface layer which can improve part quality and/or function, for instance including wear resistance and improved performance.

In some embodiments, a method comprises initially providing an electrode substrate. In some instances, an electrode substrate comprises a polymeric material, for example Acrylonitrile Butadiene Styrene (ABS). As will be appreciated, any polymeric material not inconsistent with the technical objectives of the present invention may be used. In some aspects an ABS electrode substrate can be provided and/or produced by any suitable process, for instance by an injection molding process or extrusion and thermoforming processes. In some instances, an ABS electrode substrate comprises a glass-filled or glass-fiber reinforced ABS electrode substrate. In some instances, a ABS electrode substrate can be from about 10% to about 50% glass-filled, about 15% to about 40% glass-filled, about 15% to about 30% glass filled, or about 15% to about 25% glass-filled. In some example embodiments, an ABS electrode substrate can be about 20% glass-filled. In some aspects a glass-filled or glass-fiber reinforced ABS electrode substrate can be provided in an uncoated form.

In some embodiments a polymeric substrate, such as a glass-filled ABS electrode substrate, can be coated with a film or thin film. A thin film can be coated onto the ABS electrode substrate by PVD. In some aspects, a silver (Ag) thin film can be deposited or coated onto the ABS electrode substrate by PVD. As will be appreciated, a method of PVD of Ag onto a ABS electrode substrate can in some instances be referred to as sputtering. Accordingly, sputter deposition involves exciting the molecules of a target (e.g. a block of an element or compound to be deposited) and ejecting them towards the substrate (i.e. the object to be coated). In accordance with aspects of the present technology, a portion or block of Ag is utilized as the target material and the target material's atoms are released due to collisions with high energy ions within a vacuum chamber, and those Ag atoms travel through the vacuum chamber until they collide with the surface(s) of the substrate, for example a glass-filled ABS electrode substrate. A surface preparation on the glass-filled ABS electrode substrate (e.g. a roughened surface preparation) along with the energy of the Ag atoms cause the atoms to bond to the surface and further atoms directed towards the ABS electrode substrate in the vacuum chamber can form a structure on top of the initially deposited silver atoms. The structure can continue to form, over for instance a period of time, until a deposition layer of a desired thickness is reached. In some instances, the target's position can be programmed to move around the substrate within the vacuum chamber such that all surface of the substrate (i.e. the ABS electrode substrate) is evenly coated to the desired thickness. As will be appreciated, the process can coat the ABS electrode substrate to within +/−0.1 µm.

According to embodiments described herein, an electrode substrate can take any suitable shape for implementing in a coating process or further for an application of a coated electrode, e.g. an Ag/AgCl electrode. As will be appreciated any shape of electrode substrate not inconsistent with the technical objectives of the present technology may be utilized. In one example embodiment, an electrode substrate may be formed into a shape illustrated by FIG. 2. In some other embodiments, the electrode substrate shape can be formed, designed, or otherwise configured such that all of the surfaces of the electrode substrate can be coated while being turned in a sputtering chamber, for example in some instances being continuously turned or rotated. As will be appreciated, such a configuration can be free of 90° angles and/or undercuts in the electrode substrate, for example undercuts along the longitudinal axis of the electrode.

In some aspects the deposition mechanism used for coating a substrate, such as an ABS electrode substrate, comprises one or more cathodes used to apply energy to the target material (e.g. Ag block) within a vacuum chamber to excite and release the Ag atoms for deposition onto the surface, or prepared surface, of the ABS electrode substrate.

In some embodiments, the thickness of the deposition layer (e.g. the layer of Ag on the electrode substrate) can be initially determined prior to deposition. In some embodiments, the thickness of the deposition layer can be from about 0.5 µm to about 3.0 µm, from about 0.5 µm to about 2.0 µm, from about 0.5 µm to about 1.5 µm, from about 0.5 µm to about 1.0 µm, or from about 1.0 µm to about 1.5 µm. In some embodiments, the deposition layer can be up to about 1.0 µm, up to about 1.5 µm, or up to about 2.0 µm. In one example embodiment the deposition layer is about 0.74 µm. In another example embodiment the deposition layer is about 1.2 µm.

In some embodiments, one or more deposition cycles can further comprise or more sub-steps of the one or more deposition cycles. According to some embodiments, one or more sub-steps of a deposition cycle can comprise a roughing step to rough the surface of the electrode substrate, a vacuum environment creation step to create a high vacuum environment for PVD, an etching step to etch the surface of the electrode substrate, and/or a sputtering and/or deposition step to sputter the target material and deposit the material onto the electrode substrate. As will be appreciated, any roughing, vacuum creation, or etching process not inconsistent with the technical objectives of the present invention can be used.

In some embodiments, a length of one or more deposition or coating cycles and/or the one or more sub-steps (e.g. deposition cycle times) can be based on the determined or desired thickness of the deposition layer (e.g. the thickness of the Ag layer on the electrode substrate), for instance to achieve a deposition thickness of Ag over the surface of the electrode substrate. In some embodiments, the length of a deposition cycle can be determined based on a metalizing system used in a deposition or cycle and/or one or more sub-steps. In one example embodiment, a deposition cycle for PVD of an Ag layer on a ABS electrode substrate is about 6-10 minutes in length to achieve an Ag layer of about 0.74 µm thick. In this example, roughing the surface of the ABS electrode substrate is about 15-60 seconds in length, creating the high vacuum environment is about 90-200 seconds in length, etching the surface of the ABS electrode substrate is about 15-60 seconds in length, and sputtering the Ag target onto the ABS electrode substrate is about 200-400 seconds in length. In another example embodiment, a deposition cycle for PVD of an Ag layer on a ABS electrode substrate is about 9-14 minutes in length to achieve an Ag layer of about 1.25 µm thick. In this example, roughing the surface of the ABS electrode substrate is about 15-60 seconds in length, creating the high vacuum environment is about 90-200 seconds in length, etching the surface of the ABS electrode substrate is about 15-60 seconds in length, and sputtering the Ag target onto the ABS electrode substrate is about 400-550 seconds in length. As will be appreciated, the thickness of the Ag silver layer (i.e. deposition layer or final thickness of the Ag silver layer), in some aspects, is dependent on the sputtering step of the Ag target onto the ABS electrode substrate. In some embodiments, sputtering the Ag target onto the ABS electrode substrate is up to about 100 seconds in length, up to about 150 seconds in length, up to about 200 seconds in length, up to about 250 seconds in length, up to about 300 seconds in length, up to about 350 seconds in length, up to about 400 seconds in length, up to about 450 seconds in length, up to about 500 seconds in length, up to about 600 seconds in length, up to about 700 seconds in length, up to about 800 seconds in length, up to about 900 seconds in length, or up to about 1000 seconds in length. In some other embodiments the sputtering time can be determined based on at least one of a desired thickness of the Ag over the surface of the electrode substrate and/or a metalizing system implemented.

According to some other aspects of the present technology, the material and the shape of the electrode substrate can affect or determine the one or more deposition cycle times, for instance based on the deposition rate of Ag onto the surface of the electrode substrate, for example during the sputtering step. Without intending to be bound by theory, warping of the substrate can occur due to the energy of the Ag atoms being too high for the receiving ABS electrode substrate which can result in partial melting of weaker areas of the substrate. In some aspects, the deposition rate of the Ag onto the electrode substrate can be lowered, which in turn increases the length of time of the deposition cycle, for example the duration of the sputtering step. As will be appreciated, by lowering the deposition rate, the less likely the electrode substrate will be damaged, however a longer cycle time can reduce the production time of a finished coated electrode and further the process as a whole. Accordingly, in some aspects, the deposition rate versus the cycle time can be tuned or balanced to achieve the determined thickness of the Ag deposition layer.

In some further embodiments, in addition to or instead of lowering the deposition rate a heat sink may be employed and incorporated into the high vacuum environment to actively remove excess heat from the surface of the electrode during the deposition cycle, for instance during the sputtering step.

In some embodiments, subsequent to depositing the Ag layer over or on the ABS electrode substrate and/or forming the Ag deposition layer to a determined thickness, a method for producing a silver/silver chloride (Ag/AgCl) electrode further comprises converting at least a portion of the Ag deposition layer to AgCl and forming a Ag/AgCl electrode.

In some aspects, a conversion process can include converting an Ag coated electrode into an Ag/AgCl electrode. According to some embodiments, forming the Ag/AgCl electrode comprises one or more conversion steps. In some aspects, the one or more conversion steps of a conversion process can comprise a dipping step, a rinsing step, a stabilization step, and/or a drying step.

In some embodiments, a dipping step (in some aspects referred to as a redox step) comprises dipping an Ag coated electrode into a solution (or dipping solution or redox solution). In some embodiments the solution comprises one or more of hydrochloric acid (HCL), sodium chloride (NaCl), sodium selenite ($Na_2SeO_3$), or a combination comprising any of the forgoing. In one example embodiment, the solution comprises 200 mL/L HCL, 200 g/L NaCl, about 0.4-0.6 g/L $Na_2SeO_3$. In some further embodiments the solution can be heated, either prior to or concurrently with the dipping step, to any suitable temperature not inconsistent with the technical objectives of the present invention, for example the solution can be heated to about 45° C. In some other embodiments, the solution comprises ferric chloride ($FeCl_3$). For example, in some instances, the solution comprises 1.0 M solution comprising $FeCl_3$. In some aspects, the solution is not heated during the conversion process, for instance during the dipping step. As will be appreciated, different solution ratios of one or more components in solution may be utilized. As such, any solution ratios not inconsistent with the technical objectives of the present technology can be used.

In some further embodiments, the dipping step or process can be repeated and/or performed until the Ag of the Ag coated electrode darkens. In some aspects, the dipping process can be performed for any amount of time not inconsistent with the technical objectives of the present invention, for instance based on the ratios of the components of the solution. In one example embodiment, the dipping step can be performed or carried out for about 30 to 60 seconds.

In some embodiments, subsequent to the dipping step or redox step, a rinsing process or step can be carried out. In some aspects, the electrodes can be rinsed with water.

In some embodiments, subsequent to the rinsing step, a stabilization process or step can be carried out. In some embodiments, the stabilization step comprises placing the electrodes in a stabilization solution. In some embodiments, the stabilization solution comprises at least one of water, NaCl, glycerin, or any combination of the forgoing. In one example embodiment the stabilizing solution comprises 400 mL water, 0.8 g NaCl, and 0.4 g glycerin. In some aspects, the stabilization process or step can be performed or carried out for any amount of time not inconsistent with the technical objectives of the present invention, for instance based on the ratios of the components of the stabilization solution. In one example embodiment, the stabilizing step can be performed or carried out for a time of about 24 hours.

In some embodiments, subsequent to the stabilization step, a drying process or step can be carried out. In some embodiments, the drying step comprises baking the electrodes in an oven. Any temperature and/or time not inconsistent with the objectives of the present invention may be used. In some embodiments, the drying step comprises placing the electrodes (e.g. the Ag/AgCl electrodes) in an oven at from about 40° C. to about 60° C., or for about 50° C. In some embodiments, the drying step comprises placing the electrodes (e.g. the Ag/AgCl electrodes) in an oven for about 10 minutes to about 20 minutes, for example for about 15 minutes.

It should be understood that the above-described embodiments of the present disclosure are merely possible examples of implementations set forth for a clear understanding of the principles of the disclosure. Many variations and modifications may be made to the above-described embodiments without departing substantially from the scope and principles of the disclosure. All such modifications and variations are intended to be included herein within the scope of this disclosure and protected by the following claims.

Many different arrangements of the various components and/or steps depicted and described, as well as those not shown, are possible without departing from the scope of the claims below. Embodiments of the present technology have been described with the intent to be illustrative rather than restrictive. Alternative embodiments will become apparent from reference to this disclosure. Alternative means of implementing the aforementioned can be completed without departing from the scope of the claims below. Certain features and subcombinations are of utility and can be employed without reference to other features and subcombinations and are contemplated within the scope of the claims.

The invention claimed is:

1. A method for forming an Ag/AgCl coated electrode, comprising:
   providing a polymeric electrode substrate, the polymeric electrode substrate comprising Acrylonitrile Butadiene Styrene (ABS), wherein the polymeric electrode substrate is configured as a neuromonitoring electrode;
   depositing a layer of silver (Ag) on the polymeric electrode substrate by physical vapor deposition (PVD) to form an Ag coated electrode, the layer of Ag being deposited to a first thickness, and the depositing comprising sputtering an Ag target onto the polymeric electrode substrate, wherein a deposition rate is determined at least in part on the material and the shape of the electrode substrate; and
   converting the layer of Ag to a layer of silver/silver chloride (Ag/AgCl) to form a Ag/AgCl coated surface electrode, the converting comprising dipping the Ag coated electrode into a conversion solution, wherein the conversion solution consists essentially of 1.0 M ferric chloride ($FeCl_3$), and wherein the conversion solution is not heated.

2. The method of claim 1, the polymeric electrode substrate comprising 20% glass-filled ABS.

3. The method of claim 1, the polymeric electrode substrate being injection molded.

4. The method of claim 1, the first thickness being about 0.74 μm.

5. The method of claim 4, the sputtering being carried out for up to about 300 seconds.

6. The method of claim 1, the first thickness being about 1.2-1.25 μm.

7. The method of claim 6, the sputtering being carried out for up to about 500 seconds.

8. The method of claim 1, the depositing further comprising at least one of:
   roughing a surface of the polymeric electrode substrate;
   generating a high vacuum environment; and
   etching the surface of the polymeric electrode substrate.

9. The method of claim 1, the depositing being carried out in the presence of a heat sink.

10. The method of claim 1, the dipping being carried out for a time period of about 30-60 seconds.

11. The method of claim 1, the converting further comprising a rinsing step.

12. The method of claim 1, the converting further comprising a stabilizing step.

13. The method of claim 12, the stabilizing step comprising placing the Ag/AgCl coated surface electrode in a stabilizing solution.

14. The method of claim 13, the stabilizing solution comprising one or more of water, NaCl, and glycerin, and the Ag/AgCl coated surface electrode is placed in the stabilizing solution for a stabilization time period.

15. The method of claim 1, the converting further comprising a drying step.

16. The method of claim 15, the drying step comprising baking the Ag/AgCl coated surface electrode for a drying time period.

17. The method of claim 1, the polymeric electrode substrate configured such that a plurality of surfaces of the polymeric electrode substrate can be coated while being turned in a sputtering chamber during the depositing.

18. The method of claim 17, wherein the electrode substrate is substantially free of 90° angles and/or undercuts along a longitudinal axis of the electrode substrate.

19. The method of claim 1, wherein the deposition rate versus a cycle time is tuned based on a predetermined thickness of the deposition layer.

* * * * *